United States Patent Office 3,781,216
Patented Dec. 25, 1973

3,781,216
PROCESS FOR THE PRODUCTION OF OXIDE AND CARBIDE CONTAINING NUCLEAR FUEL PARTICLES FOR HIGH TEMPERATURE REACTORS
Karl-Gerhard Hackstein, Hanau, Martin Kadner, Dornigheim, and Horst Förster, Hanau, Germany, assignors to Nukem Nuklear-Chemie und- Metallurgie, GmbH, Wolfgang, near Hanau am Main, Germany
No Drawing. Filed June 29, 1971, Ser. No. 158,094
Claims priority, application West Germany, July 28, 1970, P 20 37 232.1
Int. Cl. C01g 43/02
U.S. Cl. 252—301.1 R                              12 Claims

ABSTRACT OF THE DISCLOSURE

Spherical oxide or carbide fuel particles of uranium and/or thorium are formed by dropping an aqueous salt solution of the heavy metal, e.g., uranyl and/or thorium nitrate into an alkaline, preferably ammoniacal, precipitation bath. The solution also includes an organic polymer, preferably polyvinyl alcohol or partially hydrolyzed polyvinyl acetate, which delays the precipitation of the heavy metal compound in an alkaline medium. The polymer must be able to maintain the surface tension in spite of the precipitation of the uranium or thorium. The polymer is precipitated by an alcohol, e.g. primary or isopropyl alcohol followed by conventional drying, hardening calcining, and sintering or melting the product.

---

Spherical particles of uranium-thorium or plutonium oxide or the carbides of these metals as well as the mixed crystals of these compounds are used as fuel and breeder materials for high temperature reactors. After coating with pyrolytically deposited carbon they are worked up as coated nuclear fuel particles jointly with graphite matrices to fuel elements or fuels for high temperature reactors.

Two types of processes are primarily known for the production of spherical oxide and carbide fuel particles:

(1) Powder metallurgical processes in which the corresponding oxide powder is formed to spherical particles by granulation processes with addition of binders, for example aluminum stearate, and finally are sintered.

(2) Wet chemical processes in which the oxide hydrate sols of these elements in the form of droplets are solidified by water removal with the help of organic solvents which exhibit a limited solubility for water.

Also there is the sol-gel process which became known through the work of the United States Oak Ridge National Laboratory.

In addition it is known that efforts have been made to produce the above named fuel nuclei directly from solutions of the corresponding heavy metal salts with addition of such organic materials which in acid or neutral solution cause a relatively low viscosity but which cause a high viscosity in alkaline mediums, so that in dropping one of these materials containing heavy metal salt solutions into an ammoniacal precipittion bath particles are formed.

These processes have various disadvantages.

The powder metallurgical processes require a continuously uniform powder quality and since, for example, uranium oxide and thorium oxide are used for the thorium-uranium fuel cycle there is always the danger of an inhomogeneity.

In the sol-gel process a heavy metal sol must first be produced from a true solution which only subsequently can be worked to spherical fuel particles. Besides in addition to thorium only tetravalent uranium is easily converted into a sol, so that the normally occurring hexavalent uranium must be previously reduced in an additional process step.

The working up of true heavy metal salt solutions which contain such organic additives which in the acid or neutral range have a moderate viscosity but in the alkaline range a high viscosity is perceptively made more difficult since such materials, for the most part, are relatively quickly decomposed in the always weakly acid metal salt solutions and, therefore, still further stabilizing components are added. Thereby these systems become ever more undefined. Besides, such a process assumes that a very exact drop must be formed before the solidification in the precipitation bath, since during the drop-wise adding, such an increase in viscosity takes place in the alkaline precipitation bath that the strengths of the surface tension alone no longer are sufficient to attain a spherical form. The results are fuel particles which are not completely spherical but are rather "tear"-shaped or have a small point. This, however, is not desired on the basis of a good irradiation process of these particles subsequently coated with pyrocarbon.

All of the disadvantages of the above named processes can be eliminated with the process of the present invention.

In the process of the invention a uranyl and/or thorium nitrate, containing aqueous solution is treated with organic materials which by dropping of this solution into an alkaline precipitation bath, cause a delayed transfer of the precipitation agent required for the precipitation of the uranium and/or thorium compound so that the strengths of the surface tension forces are still fully effective for the formation of a completely spherical drop immediately after the dropping in and are only gradually broken down by the simultaneous progressive precipitation of the uranium and thorium compounds so that the spherical form is maintained.

Furthermore, the organic materials used in the process of the invention have the properties that during or after the complete precipitation of the uranium and thorium compounds in turn can be accomplished by addition of alcohol, for example, isopropanol, so that the still weak and formable particles after the precipitation of the uranium and thorium compound can be hardened thereby and therewith the spherical form remains for the subsequent drying and calcination.

The process of delayed precipitation of the uranium and/or thorium compound in the alkaline precipitation bath and the precipitation of the organic material and the accompanying hardening of the particles according to the process of the invention can take place either successively in two steps or in a single step, that is by adding to the alcoholic precipitation bath a specific amount of alcohol; for instance isopropanol or n-propanol, supplied so that the precipitation of the uranium or thorium compound and the separation of the organic substance are delayed and parallel in occurrence. The alcohol is preferably isopropanol or n-propanol but other alcohols can be used such as methanol, ethanol, n-butanol, t-butanol, isobutanol, 2-pentanol.

The aqueous thorium and/or uranium nitrate (or other salt) solution can contain 80 to 300 grams of the heavy metal per liter. When a mixture of uranyl and thorium nitrates is employed they can be present in any desired ratio.

It has furthermore been found that the surface tension in the system: uranyl and/or thorium nitrate and organic substance as compared to the ammoniacal precipitation bath is favorably influenced by the addition of small amounts of oil, e.g. paraffin oil, and thus also favors the formation of spherical drops. In place of paraffin oil there can be used liquid petrolatum or adepsine oil.

The amount of oil can be 1 to 250 grams per liter. As organic substances which on the one hand in the process of the invention effect a delayed precipitation of the uranium and/or thorium compound and on the other hand are themselves precipitatable by addition of alcohols, polymeric compounds such as polyvinyl alcohol and its derivatives, e.g. partially saponified polyvinyl esters of fatty acids such as partially saponified polyvinyl acetate have proved especially suitable. There can also be used a mixture of polyvinyl alcohol and polyethylene glycol or a mixture of polyvinyl alcohol and polypropylene glycol. The polyvinyl alcohol or other polymer can be used in an amount of 200 to 500 grams per liter. The polymer is normally water soluble but is insoluble in the alcohol employed.

By selection of the degree of polymerization of these products and the degree of saponification, e.g. 50, 60, 70, 80, 90, 95 or 99% saponification of polyvinyl acetate, as well as by variation in the amount added the delayed precipitation can be controlled within wide limits.

Unless otherwise indicated all parts and percentages are by weight.

The amount of alcohol employed is not critical but usually there is employed 0.5 liter per 100 grams of heavy metal.

EXAMPLE 1

There were conveyed in droplets into a tuyere arrangement consisting of five tuyeres or nozzles 1 liter of an aqueous solution containing uranyl nitrate, thorium nitrate and polyvinyl alcohol and having a uranium to thorium ratio of 1:10, a cocentration of heavy metal (i.e. uranium and thorium) of 120 grams/liter and 40 grams of polyvinyl alcohol/liter. These were solidified to spherical particles consisting of ammonium diuranate and thorium hydroxide and of about 1.5 mm. diameter after passing through a 50 cm. long ammonia gas atmosphere into a precipitating bath of aqueous ammonia (5% concentration). After a residence time in the precipitation bath of 30 minutes the aqueous ammoniacal solution was drawn off. Next the spherical particles were treated 8 times, each time with 1 liter of isopropanol at about 50° C. in order to completely precipitate the polyvinyl alcohol or to harden the particles. At the same time the residual ammonium nitrate was washed out.

The particles were then predried at 300° C. and next sintered in a sintering furnace under a hydrogen atmosphere at 1600° C.

The oxide particles $(U/Th)O_2$ were completely spherical, had a diameter of $350\mu$ and a density of 95% of theory.

EXAMPLE 2

25 grams of paraffin oil were dispersed in 1 liter of an aqueous polyvinyl alcohol containing uranyl nitrate solution having a concentration of 120 grams U/l. and 40 grams of polyvinyl alcohol/l. This solution was shaped through tuyeres as in Example 1 and further worked up as in that example. The sintered $UO_2$ particles had a diameter of about $400\mu$ and possessed a density of 85% of theory.

EXAMPLE 3

In order to produce carbide fuel particles, 15 grams per liter of carbon black were suspended, additionally in the starting solution described in Example 1. This solution was shaped to spherical particles in the manner described in Example 1, which particles after the drying were jacketed with graphite powder and then first converted at 1800° C. to uranium/thorium dicarbide while liberating CO and, subsequently immediately melted at 2500° C. to dense particles, having a density of 85% of theory. After separation of the graphite jacket, spherical particles having a diameter of about $300\mu$ were obtained.

In place of using uranyl nitrate or thorium nitrate there can be used the corresponding salts of the following acids hydrochloric acid, sulfuric acid, or acetic acid.

While the alkaline bath is preferably ammoniacal there can be used other alkalis such as sodium hydroxide, potassium hydroxide.

What is claimed is:

1. In the process for the production of spherical oxide or carbide fuel particles of a heavy metal from the group consisting of uranium, thorium and mixtures of uranium and thorium by dropping an aqueous heavy metal salt solution into an alkaline precipitation bath and thereafter forming said oxide or carbide, the improvement comprising including in the heavy metal salt solution an organic polymer selected from the group consisting of polyvinyl alcohol and a partially saponified polyvinyl ester of a fatty acid which delays the precipitation of the heavy metal compound in the alkaline precipitation bath and simultaneously, for a sufficient time, supports the necessary surface tension to form completely spherical drops against the precipitation medium, precipitating the organic polymer with an alkanol of 1 to 5 carbon atoms and also solidifying and hardening the particles and then drying and calcining.

2. A process according to claim 1 wherein the alcohol is isopropanol or n-propanol.

3. A process according to claim 1 wherein the alkaline precipitation bath is an ammonia bath.

4. A process according to claim 1 wherein the bath is a diluted aqueous solution of sodium hydroxide or potassium hydroxide.

5. A process according to claim 1 wherein the heavy metal salt is uranyl nitrate or thorium nitrate.

6. A process according to claim 1 wherein there are formed oxide fuel particles.

7. A process according to claim 1 wherein carbon black is added to the aqueous solution containing said heavy metal salt and the final product is uranium or thorium carbide.

8. A process according to claim 7 wherein the carbide is formed by heating the precipitated spherical drops to 1800° C. and then the carbide particles are densified by heating to 2500° C.

9. A process according to claim 1 wherein the calcining is carried out at a temperature at which the particles are sintered.

10. A process according to claim 1 wherein the calcining is carried out at a temperature at which the particles are melted.

11. A process according to claim 1 wherein the heavy metal salt solution consists of water, the heavy metal salt, the alkaline precipitating agent and the organic polymer.

12. A process according to claim 11 wherein the alkaline material is selected from the group consisting of ammonia, sodium hydroxide and potassium hydroxide, the polymer is polyvinyl alcohol or a partially saponified polyvinyl ester of a fatty acid and the alcohol is an alkanol of 1 to 5 carbon atoms.

(References on following page)

References Cited

UNITED STATES PATENTS 3,535,264  10/1970  Hackstein et al. ____ 252—301.1
3,495,954  2/1970   Grimes et al. _____ 264—0.5 X

OTHER REFERENCES

Hess, "Precipitation of Water-Soluble Polymers," Chem. Abst. vol. 55, Abst. No. 26524 h., 1961.

Horiuchi, "Emulsion Polymerization . . . Poly (vinyl alcohol)," Chem. Abst., vol. 63, Abst. No. 8499 e., 1965.

Sinclair, "Aqueous Poly (vinyl alcohol) Compositions," Chem. Abst., vol. 65, Abst. No. 15617 e., 1966.

CARL D. QUARFORTH, Primary Examiner

R. L. TATE, Assistant Examiner

U.S. Cl. X.R.

264—0.5; 423—252, 256, 260, 261